(12) United States Patent
Tashev et al.

(10) Patent No.: US 8,005,237 B2
(45) Date of Patent: Aug. 23, 2011

(54) SENSOR ARRAY BEAMFORMER POST-PROCESSOR

(75) Inventors: Ivan Tashev, Kirkland, WA (US); Alejandro Acero, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 1126 days.

(21) Appl. No.: 11/750,319

(22) Filed: May 17, 2007

(65) Prior Publication Data

US 2008/0288219 A1 Nov. 20, 2008

(51) Int. Cl.
*H04R 3/00* (2006.01)
(52) U.S. Cl. ........ 381/92; 381/94.1; 381/94.3; 367/118; 367/119; 704/226; 704/E15.015; 704/E21.002; 702/190
(58) Field of Classification Search .............. 381/91–92, 381/122, 94.1–94.3, 94.7; 367/118–119; 704/226, E21.004, E21.007, E15.015, E21.002; 702/190
See application file for complete search history.

(56) References Cited

U.S. PATENT DOCUMENTS

| | | | |
|---|---|---|---|
| 5,493,307 | A | 2/1996 | Tsijimoto |
| 6,771,986 | B1 | 8/2004 | Oh |
| 7,035,415 | B2 | 4/2006 | Belt et al. |
| 7,206,418 | B2 | 4/2007 | Yang et al. |
| 7,206,421 | B1 * | 4/2007 | Taenzer ................ 381/119 |
| 7,254,241 | B2 | 8/2007 | Rui et al. |
| 7,626,889 | B2 | 12/2009 | Seltzer et al. |
| 7,689,248 | B2 | 3/2010 | Valve et al. |
| 7,752,040 | B2 | 7/2010 | Tashev et al. |
| 7,831,036 | B2 | 11/2010 | Beaucoup et al. |
| 2003/0026437 | A1 | 2/2003 | Janse et al. |
| 2004/0001598 | A1 | 1/2004 | Balan et al. |
| 2004/0170284 | A1 | 9/2004 | Janse et al. |
| 2004/0258255 | A1 | 12/2004 | Zhang et al. |
| 2005/0018861 | A1 | 1/2005 | Tashev |
| 2005/0141731 | A1 * | 6/2005 | Hamalainen ............. 381/94.3 |
| 2005/0149320 | A1 | 7/2005 | Kajala et al. |
| 2005/0195988 | A1 | 9/2005 | Tashev et al. |
| 2005/0213778 | A1 | 9/2005 | Buck et al. |

(Continued)

FOREIGN PATENT DOCUMENTS

WO WO-2004100602 A2 11/2004

(Continued)

OTHER PUBLICATIONS

Malvar, H. S., A modulated complex lapped transform and its application to audio processing, Int'l Conf. on Acoustics, Speech, and Signal Processing, (ICASSP'99), Mar. 1999, pp. 1421-1424, Phoenix, Arizona, U.S.A.

(Continued)

*Primary Examiner* — Devona Faulk
*Assistant Examiner* — Disler Paul
(74) *Attorney, Agent, or Firm* — Lyon & Harr, LLP; Katrina A. Lyon

(57) ABSTRACT

A novel beamforming post-processor technique with enhanced noise suppression capability. The present beam forming post-processor technique is a non-linear post-processing technique for sensor arrays (e.g., microphone arrays) which improves the directivity and signal separation capabilities. The technique works in so-called instantaneous direction of arrival space, estimates the probability for sound coming from a given incident angle or look-up direction and applies a time-varying, gain based, spatio-temporal filter for suppressing sounds coming from directions other than the sound source direction resulting in minimal artifacts and musical noise.

19 Claims, 4 Drawing Sheets

U.S. PATENT DOCUMENTS

| | | | |
|---|---|---|---|
| 2006/0104455 A1 | 5/2006 | Malvar et al. | |
| 2006/0133622 A1 | 6/2006 | Chen | |
| 2006/0147054 A1* | 7/2006 | Buck et al. | 381/92 |
| 2006/0153360 A1 | 7/2006 | Kellerman et al. | |
| 2006/0171547 A1* | 8/2006 | Lokki et al. | 381/92 |
| 2006/0286955 A1 | 12/2006 | Yoshida et al. | |
| 2007/0076898 A1 | 4/2007 | Sarroukh et al. | |
| 2007/0150268 A1* | 6/2007 | Acero et al. | 704/226 |
| 2007/0150288 A1* | 6/2007 | Wang et al. | 704/275 |
| 2007/0273585 A1 | 11/2007 | Sarroukh et al. | |

FOREIGN PATENT DOCUMENTS

| | | |
|---|---|---|
| WO | WO-2005076663 A1 | 8/2005 |
| WO | WO-2006027707 A1 | 3/2006 |

OTHER PUBLICATIONS

Marro, C., Y. Mahieux, and K. U. Simmer, Analysis of noise reduction and dereverberation techniques based on microphone arrays with postfiltering, IEEE Trans. on Speech and Audio Processing, 1998, pp. 240-259, vol. 6.

McAulay, R. J. and M. L. Malpass, Speech enhancement using a soft-decision noise suppression filter, IEEE Trans. Acoustics, Speech, and Signal Proc., 1980, pp. 137-145, vol. 28, No. 2.

McCowan, I. and H. Bourlard, Microphone array post-filter for diffuse noise field, Proc. IEEE Int'l Conf. on Acoustics, Speech and Signal Processing (ICASSP), May 2002, pp. 905-908, vol. 1, Orlando, FL, USA.

McCowan, I., C. Marro, and L. Mauuary, Robust speech recognition using near-field superdirective beamforming with post-filtering, Proc. of 25th IEEE Int'l Conf. Acoust. Speech and Signal Processing, ICASSP-2000, 2000, pp. 1723-1726, vol. 3.

Sohn, J., N. S. Kim, and W. Sung, A statistical model-based voice activity detection, IEEE Signal Processing Letters, Jan. 1999, pp. 1-3, vol. 6, No. 1.

Tashev, I., H. S. Malvar, A new beamformer design algorithm for microphone arrays, Proc. of Int'l Conf. of Acoustic, Speech and Signal Processing, ICASSP 2005, Mar. 2005, pp. 101-104, vol. 3, Philadelphia, PA, USA.

Tashev, I., M. Seltzer, A. Acero, Microphone array for headset with spatial noise suppressor, Proc. of Ninth Int'l Workshop on Acoustic, Echo and Noise Control, IWAENC 2005, Sep. 2005, Eindhoven, The Netherlands.

Zelinski, R., A microphone array with adaptive post-filtering for noise reduction in reverberant rooms, Proc. 13th IEEE Int'l Conf. Acoust. Speech Signal Processing, ICASSP-88, Apr. 11-14, 1988, pp. 2578-2581, New York, USA.

Claesson, I., S. Nordholm, A spatial filtering approach to robust adaptive beamforming, IEEE Trans. on Antennas and Propagation, Sep. 1992, vol. 40, No. 9, pp. 1093-1096.

Cox, H., R. M. Zeskind, and M. M. Owen, Robust adaptive beamforming, IEEE Trans. on Acoustics, Speech and Signal Processing, Oct. 1987, pp. 1365-1376, vol. 35, No. 10.

Godara, L. C., Application of antenna arrays to mobile communications, Part II. Beam-forming and direction of arrival considerations, Proceedings of the IEEE, Aug. 1997, pp. 1195-1245, vol. 85, No. 8, Institute of Electrical and Electronics Engineers, New York, NY.

Herbordt, W., W. Kellermann, Computationally efficient frequency-domain robust generalized sidelobe canceller, IEEE Workshop on Acoustic Echo and Noise Control (IWAENC), Sep. 2001, pp. 51-54, Darmstadt, Germany.

Hoshuyama, O., A. Sugiyama, and A. Hirano, A robust adaptive beamformer for microphone arrays with a blocking matrix using constrained adaptive filters, IEEE Trans. Signal Processing, Oct. 1999, vol. 47, No. 10, pp. 2677-2684.

Tashev, I., A. Acero, Microphone array post-processor using instantaneous direction of arrival, Int'l Workshop on Acoustic Echo and Noise Control, (IWAENC 2006), Sep. 2006, Paris, France.

Disler Paul, U.S. Appl. No. 11/689,628, U.S. Office Action, Nov. 23, 2010.

Disler Paul, U.S. Appl. No. 11/689,628, U.S. Notice of Allowance, May 3, 2010.

\* cited by examiner

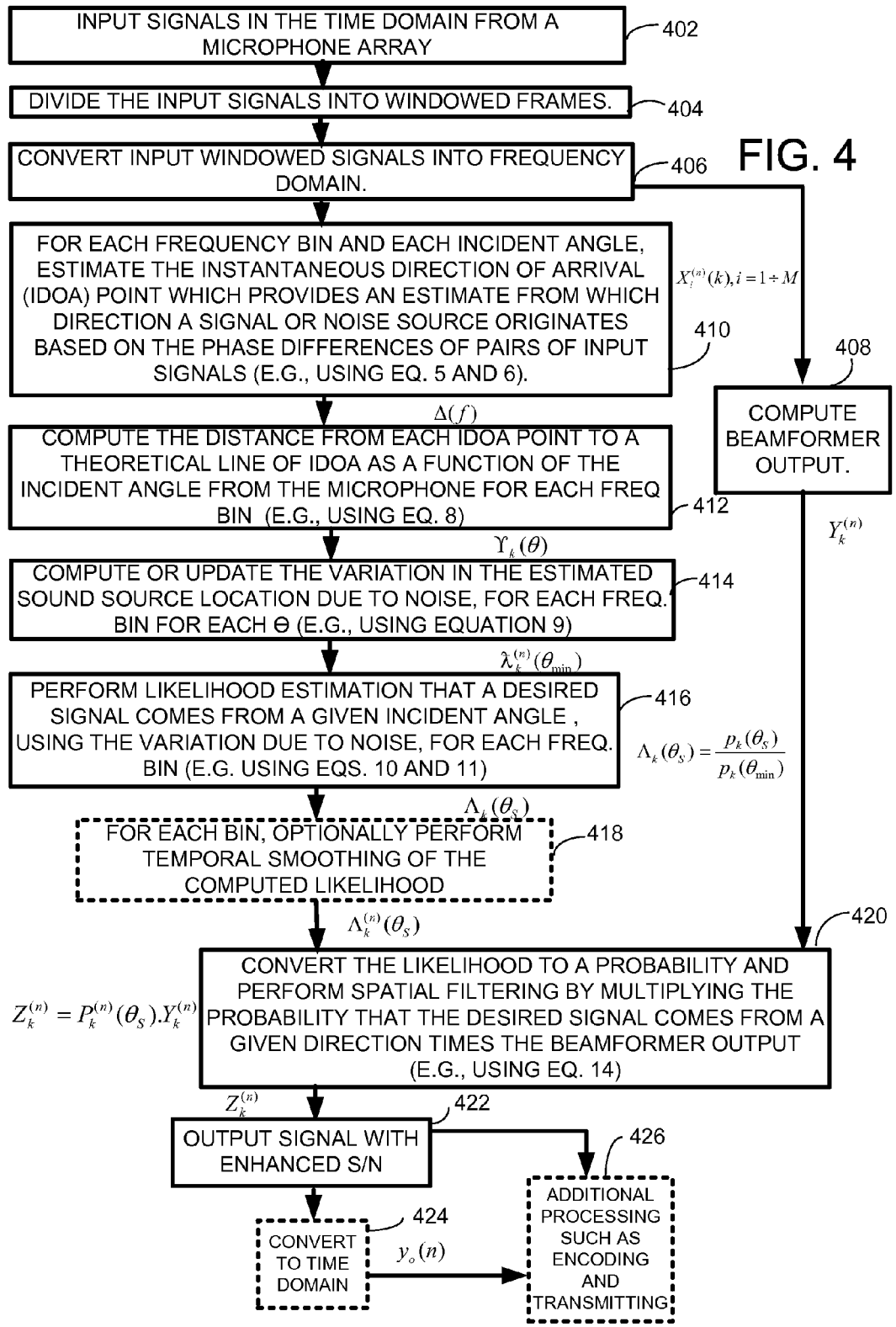

SENSOR ARRAY BEAMFORMER POST-PROCESSOR

BACKGROUND

Using multiple sensors arranged in an array, for example microphones arranged in a microphone array, to improve the quality of a captured signal, such as an audio signal, is a common practice. Various processing is typically performed to improve the signal captured by the array. For example, beamforming is one way that the captured signal can be improved.

Beamforming operations are applicable to processing the signals of a number of arrays, including microphone arrays, sonar arrays, directional radio antenna arrays, radar arrays, and so forth. In general, a beamformer is basically a spatial filter that operates on the output of an array of sensors, such as microphones, in order to enhance the amplitude of a coherent wave front relative to background noise and directional interference. In the case of a microphone array, beamforming involves processing output audio signals of the microphones of the array in such a way as to make the microphone array act as a highly directional microphone. In other words, beamforming provides a "listening beam" which points to, and receives, a particular sound source while attenuating other sounds and noise, including, for example, reflections, reverberations, interference, and sounds or noise coming from other directions or points outside the primary beam. Beamforming operations make the microphone array listen to given look-up direction, or angular space range. Pointing of such beams to various directions is typically referred to as beam-steering. A typical beamformer employs a set of beams that cover a desired angular space range in order to better capture the target or desired signal. There are, however limitations to the improvement possible in processing a signal by employing beamforming.

Under real life conditions high reverberation leads to spatial spreading of the sound, even of point sources. For example, in many cases point noise sources are not stationary and have the dynamics of the source speech signal or are speech signals themselves, i.e. interference sources. Conventional time invariant beamformers are usually optimized under the assumption of isotropic ambient noise. Adaptive beamformers, on the other hand, work best under low reverberation conditions and a point noise source. In both cases, however the improvements possible in noise suppression and signal selection capabilities of these algorithms are nearly exhausted with already existing algorithms.

Therefore, the SNR of the output signal generated by conventional beamformer systems is often further enhanced using post-processing or post-filtering techniques. In general, such techniques operate by applying additional post-filtering algorithms for sensor array outputs to enhance beamformer output signals. For example, microphone array processing algorithms generally use a beamformer to jointly process the signals from all microphones to create a single-channel output signal with increased directivity and thus higher SNR compared to a single microphone. This output signal is then often further enhanced by the use of a single channel post-filter for processing the beamformer output in such a way that the SNR of the output signal is significantly improved relative to the SNR produced by use of the beamformer alone.

Unfortunately, one problem with conventional beamformer post-filtering techniques is that they generally operate on the assumption that any noise present in the signal is either incoherent or diffuse. As such, these conventional post-filtering techniques generally fail to make allowances for point noise sources which may be strongly correlated across the sensor array. Consequently, the SNR of the output signal is not generally improved relative to highly correlated point noise sources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, the present beamforming post-processor technique is a novel technique for post-processing a sensor array's (e.g., a microphone array's) beamformer output to achieve better spatial filtering under conditions of noise and reverberation. For each frame (e.g., audio frame) and frequency bin the technique estimates the spatial probability for sound source presence (the probability that the desired sound source is in a particular look-up direction or angular space). It uses the spatial probability for the sound source presence and multiplies it by the beamformer output for each frequency bin to select the desired signal and to suppress undesired signals (i.e. not coming from the likely sound source direction or sector).

The technique uses so called instantaneous direction of arrival space (IDOA) to estimate the probability of the desired or target signal arriving from a given location. In general, for a microphone array, the phase differences at a particular frequency bin between the signals received at a pair of microphones give an indication of the instantaneous direction of arrival (IDOA) of a given sound source. IDOA vectors provide an indication of the direction from which a signal and/or point noise source originates. Non-correlated noise will be evenly spread in this space, while the signal and ambient noise (correlated components) will lie inside a hyper-volume that represents all potential positions of a sound source within the signal field.

In one embodiment the present beamforming post-processor technique is implemented as a real-time post-processor after a time-invariant beamformer. The present technique substantially improves the directivity of the microphone array. It is CPU efficient and adapts quickly when the listening direction changes even in the presence of ambient and point noise sources. One exemplary embodiment of the present technique improves the performance of a traditional time invariant beamformer 3-9 dB.

It is noted that while the foregoing limitations in existing sensor array beamforming and noise suppression schemes described in the Background section can be resolved by a particular implementation of the present beamforming post-processor technique, this is in no way limited to implementations that just solve any or all of the noted disadvantages. Rather, the present technique has a much wider application as will become evident from the descriptions to follow.

In the following description of embodiments of the present disclosure reference is made to the accompanying drawings which form a part hereof, and in which are shown, by way of illustration, specific embodiments in which the technique may be practiced. It is understood that other embodiments may be utilized and structural changes may be made without departing from the scope of the present disclosure.

DESCRIPTION OF THE DRAWINGS

The specific features aspects, and advantages of the disclosure will become better understood with regard to the following description, appended claims, and accompanying drawings where:

FIG. 4 is a flow diagram depicting one more detailed exemplary embodiment of a process employing the present beamforming post-processor technique.

DETAILED DESCRIPTION 1.0 The Computing Environment

Before providing a description of embodiments of the present Beamforming post-processor technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 1:
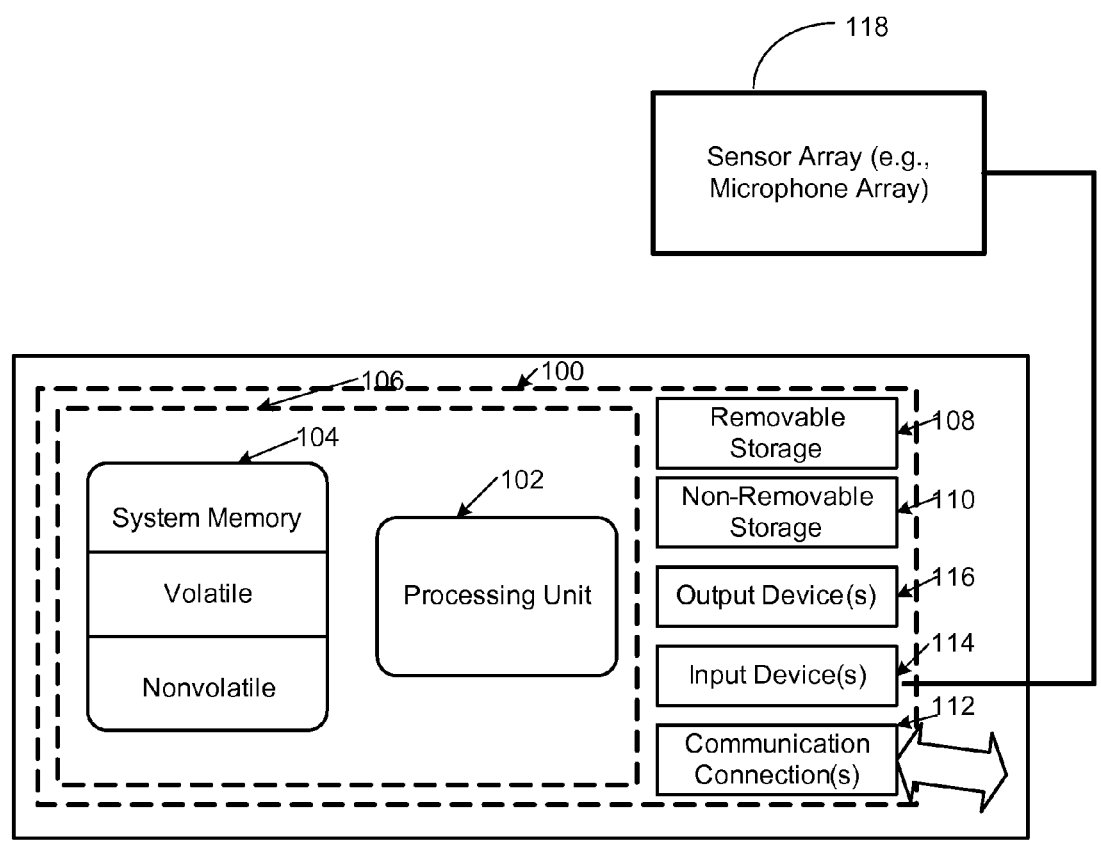
FIG. 1 is a diagram depicting a general purpose computing device constituting an exemplary system for a implementing a component of the present beamforming post-processor technique.

FIG. 1 illustrates an example of a suitable computing system environment. The computing system environment is only one example of a suitable computing environment and is not intended to suggest any limitation as to the scope of use or functionality of the present beamforming post-processor technique. Neither should the computing environment be interpreted as having any dependency or requirement relating to any one or combination of components illustrated in the exemplary operating environment. With reference to FIG. 1 an exemplary system for implementing the present beamforming postprocessor technique includes a computing device, such as computing device 100. In its most basic configuration, computing device 100 typically includes at least one processing unit 102 and memory, 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 has a sensor array 118, such as, for example, a microphone array, and may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation communication media includes wired media such as a wired network or direct-wired connection, and wireless media such as acoustic, RF, infrared and other wireless media. The term computer readable media as used herein includes both storage media and communication media.

Device 100 may have various input device(s) 114 such as a keyboard, mouse, pen, camera, touch input device, and so on. Output device(s) 116 such as a display, speakers, a printer, and so on may also be included. All of these devices are well known in the art and need not be discussed at length here.

The present beamforming post-processor technique may be described in the general context of computer-executable instructions, such as program modules, being executed by a computing device. Generally, program modules include routines, programs, objects, components, data structures, and so on, that perform particular tasks or implement particular abstract data types. The present beam forming post-processor technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present beamforming post-processor technique.

2.0 Beamforming Post-Processor Technique

In one embodiment, the present beamforming post-processor technique is a non-linear post-processing technique for sensor arrays, which improves the directivity of the beamformer and separates the desired signal from noise. The technique works in so-called instantaneous direction of arrival space to estimate the probability of the signal coming from a given location (e.g., look-up direction in angular space) and uses this probability to apply a time-varying, gain-based, spatio-temporal filter for suppressing sounds coming from other non-desired directions other than the estimated sound source direction, resulting in minimal artifacts and musical noise.

2.2 Exemplary Architecture of the Present Beamforming Post-Processor Technique.

Figure 2:
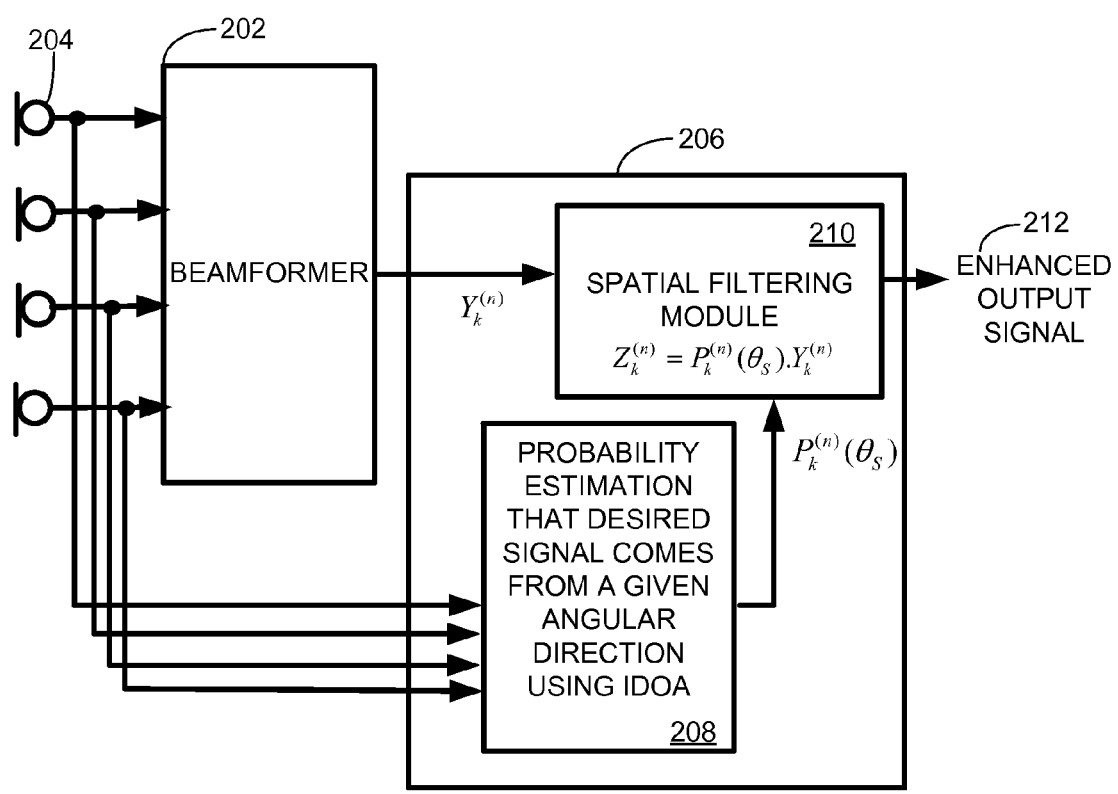
FIG. 2 is a diagram depicting one exemplary architecture of the present beamforming post-processor technique.

One exemplary architecture of the present beamforming post-processor technique 200 is shown in FIG. 2. This architecture 200 consists of a conventional beamformer 202 which receives inputs from an array of sensors, such as, for example, an array of microphones 204. The output of the beamformer 202 is input into a post-processor 206, which consists of a spatial filtering module 210 and a spatial probability estimation module 208 which employs an instantaneous direction of arrival computation. The spatial probability estimation module 208 estimates the probability that the desired signal originates from a given direction, $\theta_S$, using the inputs from the array of sensors. This probability is then multiplied by the beamformer output in the spatial filtering module 210, to provide the desired sound source signal with an improved signal to noise ratio 212.

2.3 Exemplary Process Employing the Present Beamforming Post-Processor Technique.

Figure 3:
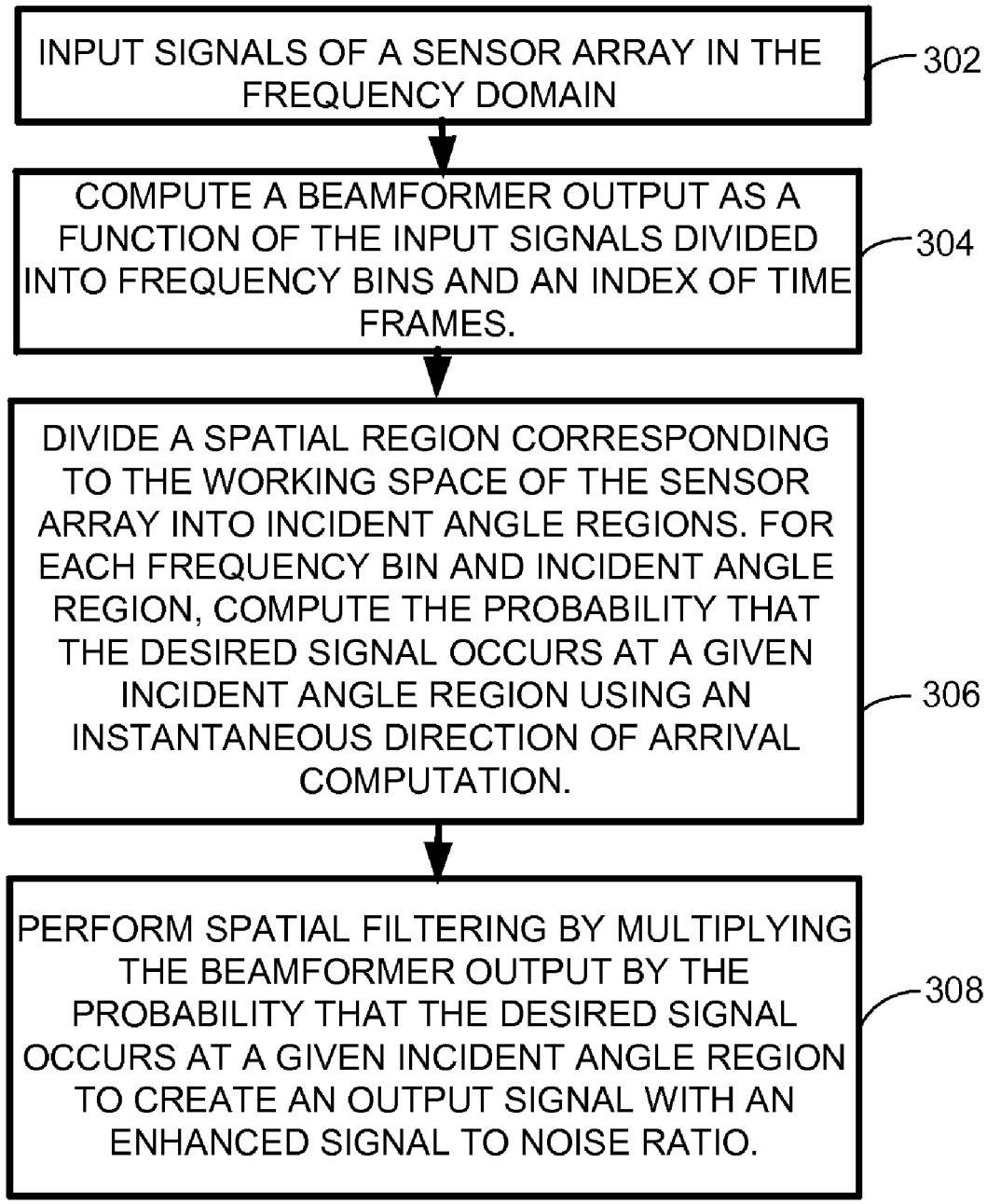
FIG. 3 is a flow diagram depicting one generalized exemplary embodiment of a process employing the present beamforming post-processor technique.

One very general exemplary process employing the present post-processor beamforming technique is shown in FIG. 3. As shown in FIG. 3, box 302, signals of a sensor array in the frequency domain are input into a standard beamformer. A beamformer output is computed as a function of the input signals divided into frequency bins and an index of time frames (box 304). The probability that the desired signal originates a given direction $\theta_S$ is computed using an instantaneous direction of arrival computation (box 306). This probability is multiplied by the beamformer output (box 308) to produce the desired signal with an enhanced signal to noise ratio (box 310).

More particularly, a more detailed exemplary process employing the present beamforming post-processor technique for a microphone is shown in FIG. 4. The audio signals captured by the microphone array $x_i(t), i=1 \ldots (M-1)$, where M is the number of microphones, are digitized using conventional analog to digital (A/D) conversion techniques, breaking the audio signals into frames (boxes 402, 404). The present beamforming post-processor technique then converts the time-domain signal $x_i(n)$ to the frequency-domain (box 406). In one embodiment a modulated complex lapped transform (MCLT) is used for this purpose, although other conventional transforms could equally well be used. One can denote the frequency domain transform as $X_i^{(n)}(k)$, where k is the frequency bin, n is the index of the time-frame (e.g., frame), and i is the microphone (where i is 1 to M)).

The signals in the frequency domain, $X_i^{(n)}(k)$, are then input into a beamformer, whose output represents the optimal solution for capturing an audio signal at a target point using the total microphone array input (box 408). Additionally, the signals in the frequency domain are used to compute the instantaneous direction of arrival of the desired signal for each angular space (defined by incident angle or look-up angle (box 410)). This information is used to compute the spatial variation of the sound source position in presence of Noise ($N(0,\lambda_{IDOA}(k))$), for each frequency bin. The IDOA information and the spatial variation of the sound source in the presence of Noise is then used to compute the probability density that the desired sound source signal comes from a given direction, $\theta$, for each frequency bin (box 412). This probability is used to compute the likelihood that for a frequency bin k of a given frame the desired signal originates from a given direction $\theta_S$ (414). If desired this likelihood can also optionally be temporally smoothed (box 416). The likelihood, smoothed or not, is then used to find the estimated probability that the desired signal originates from direction $\theta_S$. Spatial filtering is then performed by multiplying the estimated probability the desired signal comes from a given direction by the beamformer output (box 418), outputting a signal with an enhanced signal to noise ratio (box 420). The final output in the time domain can be obtained by taking the inverse-MCLT (IMCLT) or corresponding inverse transformation of the transformation used to convert to frequency domain (inverse Fourier transformation, for example), of the enhanced signal in the frequency domain (box 422). Other processing such as encoding and transmitting the enhanced signal can also be performed (box 424).

2.4 Exemplary Computations

The following paragraphs provide exemplary models and exemplary computations that can be employed with the present beamforming post-processor technique.

2.4.1 Modeling

A typical beamformer is capable of providing optimized beam design for sensor arrays of any known geometry and operational characteristics. In particular, consider an array of M microphones with a known positions vector $\vec{p}$. The microphones in the array sample the signal field in the workspace around the array at locations $p_m = (x_m, y_m, z_m) : m=0, 1, \ldots, M-1$. This sampling yields a set of signals that are denotes by the signal vector $\vec{x}(t, \vec{p})$.

Further, each microphone m has a known directivity pattern, $U_m(f,c)$, where f is the frequency and $c=\{\phi,\theta,\rho\}$ represents the coordinates of a sound source in a radial coordinate system. A similar notation will be used to represent those same coordinates in a rectangular coordinate system, in this case, $c=\{x,y,z\}$. As is known to those skilled in the art, the directivity pattern of a microphone is a complex function which provides the sensitivity and the phase shift introduced by the microphone for sounds coming from certain locations or directions. For an ideal omni-directional microphone, $U_m(f, c) = $ constant. However, the microphone array can use microphones of different types and directivity patterns without loss of generality of the typical beamformer.

2.4.1.1 Sound Capture Model

Let vector $\vec{p} = \{p_m m=0,1 \ldots M-1\}$; denote the positions of the M microphones in the array, where $p_m = (x_m, y_m, z_m)$. This yields a set of signals that one can denote by vector $\vec{x}(t, \vec{p})$. Each sensor m has known directivity pattern $U_m(f,c)$, where $c=\{\phi,\theta,\rho\}$ represents the coordinates of the sound source in a radial coordinate system and f denotes the signal frequency. It is often preferable to perform signal processing algorithms in the frequency domain because efficient implementations can be employed.

As is known to those skilled in the art, a sound signal originating at a particular location, c, relative to a microphone array is affected by a number of factors. For example, given a sound signal, $S(f)$ originating at point c, the signal actually captured by each microphone can be defined by Equation (1), as illustrated below:

$$X_m(f,p_m) = D_m(f,c)S(f) + N_m(f) \tag{1}$$

where the first term on the right-hand side, $$D_m(f, c) = \frac{e^{-j2\pi f \frac{|c-p_m|}{v}}}{\|c - p_m\|} A_m(f) U_m(f, c) \tag{2}$$

represents the delay and decay due to the distance from the sound source to the microphone $\|c-p_m\|$, and v is the speed of sound. The term $A_m(f)$ is the frequency response of the system preamplifier/ADC circuitry for each microphone, m, $S(f)$ is the source signal, and $N_m(f)$ is the captured noise. The variable $U_m(f,c)$ accounts for microphone directivity relative to point c.

2.4.1.2 Ambient Noise Model

Given the captured signal, $X_m(f,p_m)$ the first task is to compute noise models for modeling various types of noise within the local environment of the microphone array. The noise models described herein distinguish two types of noise: isotropic ambient nose and instrumental noise. Both time and frequency-domain modeling of these noise sources are well known to those skilled in the art. Consequently, the types of noise models considered will only be generally described below.

The captured noise $N_m(f,p_m)$ is considered to contain two noise components: acoustic noise and instrumental noise. The acoustic noise, with spectrum denoted with $N_A(f)$ is correlated across all microphone signals. The instrumental noise, having a spectrum denoted by the term $N_I(f)$, represents electrical circuit noise from the microphone preamplifier, and ADC (analog/digital conversion) circuitry. The instrumental noise in each channel is incoherent across the channels, and usually has a nearly white noise spectrum $N_I(f)$. Assuming isotropic ambient noise one can represent the signal, captured by any of the microphones, as a sum of infinite number of uncorrelated noise sources randomly spread in space:

$$N_m = N_A \sum_{l=1}^{\infty} D_m(c_l)\mathbb{N}(0, \lambda_l(c_l)) + N_l\mathbb{N}(0, \lambda_l) \qquad (3)$$

Indices for frame and frequency are omitted for simplicity. Estimation of all of these noise sources is impossible because one has a finite number of microphones. Therefore, the isotropic ambient noise is modeled as one noise source in different positions in the work volume for each frame, plus a residual incoherent random component, which incorporates the instrumental noise. The noise capture equation changes to:

$$N_m^{(n)} = D_m(c_n)N(0,\lambda_N(c_n)) + N(0,\lambda_{NC}) \qquad (4)$$

where $c_n$ is the noise source random position for $n^{th}$ audio frame, $\lambda_N(c_n)$ is the spatially dependent correlated noise variation ($\lambda_N(c_n)$=const $\forall c_n$ for isotropic noise) and $\lambda_{NC}$ is the variation of the incoherent component.

2.4.2 Spatio-Temporal Filter

The sound capture model and noise models having been described, the following paragraphs describe the computations performed in one embodiment of the present beamforming post-processor technique to obtain a spatial and temporal post-processor that improves the quality of the beamformer output of the desired signal. The following paragraphs are also referenced with respect to the flow diagram shown in FIG. 4.

2.4.2.1 Instantaneous Direction Of Arrival Space

In general, for a microphone array, the phase differences at a particular frequency bin between the signals received at a pair of microphones give an indication of the instantaneous direction of arrival (IDOA) of a given sound source. IDOA vectors provide an indication of the direction from which a signal and/or point noise source originates. Non-correlated noise will be evenly spread in this space, while the signal and ambient noise (correlated components) will lie inside a hypervolume that represents all potential positions of a sound source within the signal field.

To provide an indication of the direction a signal or noise source originates from (as indicated in FIG. 4, box 410), one can find the instantaneous Direction of Arrival (IDOA) for each frequency bin based on the phase differences of non-repetitive pairs of input signals. For M microphones these phase differences form a M−1 dimensional space, spanning all potential IDOA. If one defines an IDOA vector in this space as $$\Delta(f) \triangleq [\delta_1(f), \delta_2(f), \ldots, \delta_{M-1}(f)] \qquad (5)$$

where $\delta_i(f)$ is the phase difference between channels 1 and i+1:

$$\delta_i(f) = \arg(X_1(f)) - \arg(X_{i+1}(f)) l = \{1, \ldots, M-1\} \qquad (6)$$

then the non-correlated noise will be evenly spread in this space, while the signal and ambient noise (correlated components) will lay inside a hypervolume that represents all potential positions $c=\{\phi,\theta,\rho\}$ of a sound source in real three dimensional space. For far field sound capture, this is a M−1 dimensional hypersurface as the distance is presumed to approach infinity. Linear microphone arrays can distinguish only one dimension—the incident angle, and the real space is represented by a M−1 dimensional hyperline. For each frequency a theoretical line that represents the positions of sound sources in the angular range of −90 degrees to +90 degrees can be computed using Equation (5). The actual distribution of the sound sources is a cloud around the theoretical line due to the presence of an additive non-correlated component. For each point in the real space there is a corresponding point in the IDOA space (which may be not unique). The opposite is not rue: there are points in the IDOA space without corresponding point in the real space.

2.4.2.2 Presence of a Sound Source.

For simplicity and without any loss of generality, a linear microphone array is considered, sensitive only to the incident angle θ-direction of arrival in one dimension. The incident angle is defined by a discretization of space. For example, in one embodiment a set of angles is defined that is used to compute various parameters—probability, likelihood, etc. Such set can, for example, be in from −90 to +90 degrees every 5 degrees. Let $\Psi_k(\theta)$ denote the function that generates the vector $\Delta$ for given incident angle θ and frequency bin k according to equations (1), (5) and (6). In each frame, the $k^{th}$ bin is represented by one point $\Delta_k$ in the IDOA space. Consider a sound source at $\theta_S$ with its correspondence in IDOA space at $\Delta_S(k)=\Psi_k(\theta_S)$. With additive noise, the resultant point in IDOA space will be spread around $\Delta_S(k)$.

$$\Delta_{S+N}(k) = \Delta_S(k) + N(0,\lambda_{IDOA}(k)). \qquad (7)$$

where $N(0,\lambda_{IDOA}(k))$ is the spatial movement of $\Delta_k$ in the IDOA space caused by the correlated and non-correlated noises.

2.4.2.3 Space Conversion

The distance from each IDOA point to the theoretical in IDOA space is computed as a function of incident angle space, as shown in FIG. 4, box 412. The conversion from the distance from an IDOA point to the theoretical hyperline in IDOA space into the incident angle space (real world, one dimensional in this case) is given by:

$$\Upsilon_k(\theta) = \frac{\|\Delta_k - \Psi_k(\theta)\|}{\left\|\frac{d\Psi_k(\theta)}{d\theta}\right\|} \qquad (8)$$

where $\|\Delta_k - \Psi_k(\theta)\|$ is the Euclidean distance between $\Delta_k$ and $\Psi_k(\theta)$ in IDOA space, $$\frac{d\Psi_k(\theta)}{d\theta}$$

are the partial derivatives, and $\gamma_k(\theta)$ is the distance of observed IDOA point to the points in the real world. Note that the dimensions in IDOA space are measured in radians as phase difference, while $\gamma_k(\theta)$ is measured in radians as units of incident angle. This computation provides the distance between each IDOA point and the theoretical line as a function of the incident angle for each frequency bin and each frame.

2.4.2.4 Estimation of the Variance in Real Space

As shown in FIG. 4, box 414, in order to compute the probability that the sound source originates from a given incident angle, one must have the conversion from distance to the theoretical hyperline in IDOA space to distance into the incident angle space given by Equation (7) and the noise properties.

Analytic estimation in real-time of the probability density function for a sound source in every frequency bin is computationally expensive. Therefore the beamforming post-processor technique estimates indirectly the variation $\lambda_k(\theta)$ of the sound source position in presence of noise $N(0,\lambda_{IDOA}(k))$ from Equation (7). Let $\lambda_k(\theta)$ and $\gamma_k(\theta)$ be a K×N matrix where K is the number of frequency bins and N is the number of discrete values of the incident or direction angle of the microphone. Variation estimation goes through two stages. During the first stage a rough variation estimation matrix $\mathbf{\lambda}(\theta,k)$ is built. If $\theta_{min}$ is the angle that minimizes $\gamma_k(\theta)$, only the minimum values in the rough model are updated:

$$\mathbf{\lambda}_k^{(n)}(\theta_{min}) = (1-\alpha)\mathbf{\lambda}_k^{(n-1)}(\theta_{min}) + \alpha\gamma_k(\theta_{min})^2 \quad (9)$$

where $\gamma$ is estimated according to Eq. (8), $$\alpha = \frac{T}{\tau_A}$$

($\tau_A$ is the adaptation time constant, T is the frame duration). During the second stage a direction-frequency smoothing filter $H(\theta,k)$ is applied after each update to estimate the spatial variation matrix $\lambda(\theta,k) = H(\theta,k) * \mathbf{\lambda}(\theta,k)$. Here it is assumed a Gaussian distribution of the non-correlated component, which allows one to assume the same deviation in the real space towards the incident angle, $\theta$.

2.4.2.5 Likelihood Estimation

As shown in FIG. 4, box 416, a likelihood estimation that the desired signal comes from a given incident angle is computed using the IDOA information and the variation due to noise. With known spatial variation $\lambda_k(\theta)$ and the distance of the observed IDOA points to the points in the real world, $\gamma_k(\theta)$, the probability density for frequency bin k to originate from direction $\theta$ is given by:

$$p_k(\theta) = \frac{1}{\sqrt{2\pi\lambda_k(\theta)}} \exp\left\{\frac{\Upsilon_k(\theta)^2}{2\lambda_k(\theta)}\right\}, \quad (10)$$

and for a given direction, $\theta_S$ the likelihood that the sound source originates from, this direction for a given frequency bin is:

$$\Lambda_k(\theta_S) = \frac{p_k(\theta_S)}{p_k(\theta_{min})}, \quad (11)$$

where $\theta_{min}$ is the value which minimizes $p_k(\theta)$.

2.4.2.6 Spatio-Temporal Filtering

Besides spatial position, the desired (e.g., speech) signal has temporal characteristics and consecutive frames are highly correlated due to the fact that this signal changes slowly relatively to the frame duration. Rapid change of the estimated spatial filter can cause musical noise and distortions in the same way as in gain based noise suppressors. As shown in FIG. 4, box 418, to reflect the temporal characteristics of the speech signal, temporal smoothing can optionally be applied. For a given direction, the absence/presence of speech can be modeled with two states: $S_0$ and $S_1$. The sequence of frequency bin states is modeled as first-order Markov process. Then the pseudo-stationary property of the desired (e.g., speech) signal can be represented by $P(q_n=S_1|q_{n-1}=S_1)$ with the following constraint: $P(q_n=S_1|q_{n-1}=S_1)>(q_n=S_1)$ where $q_n$ denotes the state of n-th frame as either $S_0$ or $S_1$. By assuming that the Markov process is time invariant, one can use the notation $$a_{ij} \triangleq P(q_n = H_j | q_{n-1} = H_j).$$

Based on the formulations above, a recursive formula for signal presence likelihood for given lookup direction in $n^{th}$ frame $\Lambda_k^{(n)}$ is obtained as:

$$\Lambda_k^{(n)}(\theta_S) = \frac{a_{01} + a_{11}\Lambda_k^{(n-1)}(\theta_S)}{a_{00} + a_{10}\Lambda_k^{(n-1)}(\theta_S)} \Lambda_k(\theta_S), \quad (12)$$

where $a_{ij}$ are the transition probabilities, $\Lambda_k(\theta_S)$ is estimated by Equation (11), and $\Lambda_k^{(n)}(\theta_S)$ is the likelihood of having a signal at direction $\theta_S$ for $n^{th}$ frame. As shown in FIG. 4, box 420, this likelihood can be converted to a probability and spatial filtering can be performed by multiplying the probability that the desired signal comes form a given direction times the beamformer output. More specifically, conversion to probability gives the estimated probability for the speech signal to originate from this direction:

$$P_k^{(n)}(\theta_S) = \frac{\Lambda_k^{(n)}(\theta_S)}{1 + \Lambda_k^{(n)}(\theta_S)}. \quad (13)$$

The spatio-temporal filter to compute the post-processor output $Z_k^{(n)}$ (for all frequency bins in the current frame) from the beamformer output $Y_k^{(n)}$ is:

$$Z_k^{(n)} = P_k^{(n)}(\theta_S) \cdot Y_k^{(n)}, \quad (14)$$

i.e. the signal presence probability is used as a suppression.

It should also be noted that any or all of the aforementioned alternate embodiments may be used in any combination desired to form additional hybrid embodiments. For example, even though this disclosure describes the present beamforming post-processor technique with respect to a microphone array, the present technique is equally applicable to sonar arrays, directional radio antenna arrays, radar arrays, and the like. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. A computer-implemented process for improving the directivity and signal to noise ratio of the output of a beamformer employed with a sensor array, comprising:
   inputting signals of sensors of a sensor array in the frequency domain defined by frequency bins and frames in time;
   computing a beamformer output as function of the input signals divided into frequency bins and frames in time;
   dividing a spatial region corresponding to a working space of the sensor array into a plurality of incident angle regions, and for each frequency bin and incident angle region, computing the probability that the desired signal occurs at a given incident angle region using an instantaneous direction of arrival computation and computation of a spatial variation of a signal due to noise; and
   spatially filtering the beamformer output by multiplying the probability that the desired signal occurs at a given incident angle region by the beamformer output.

2. The computer-implemented process of claim 1 wherein the input signals of the sensor array in the frequency domain are converted from the time domain into the frequency domain prior to inputting them using a Modulated Complex Lapped Transform (MCLT).

3. The computer-implemented process of claim 1 wherein the sensors are microphones and wherein the sensor array is a microphone array.

4. The computer-implemented process of claim 1 wherein the sensors are one of:
   sonar receivers and wherein the sensor array is a sonar array;
   directional radio antennas and the sensor array is a directional radio antenna array; and
   radars and wherein the sensor array is a radar array.

5. The computer-implemented process of claim 1 wherein the instantaneous direction of arrival computation for each frequency bin is based on the phase differences of the input signals from a pair of sensors.

6. The computer-implemented process of claim 1 wherein spatially filtering the beamformer output attenuates signals originating from directions other than the direction of the desired signal.

7. A computer-implemented process for improving the signal to noise ratio of one or more signals from sensors of a sensor array, comprising:
   inputting signals from microphones of a microphone array in the frequency domain;
   dividing the input signals into frequency bins and frames;
   computing a beamformer output from the input signals of the microphone array;
   dividing a spatial region corresponding to a working space of the sensor array into a plurality of incident angle regions;
   for each frequency bin and incident angle region, estimating an instantaneous direction of arrival point which provides an estimation from which direction a signal or noise source originates based on the phase differences of pairs of input signals from two different microphones;
   computing the distance from each instantaneous direction of arrival point to a theoretical line of instantaneous direction of arrival as a function of the incident angle for each frequency bin;
   computing the variation due to noise in the estimation from which direction a signal or noise source originates for each frequency bin for a set of incident angle ranges;
   performing a likelihood estimation that a desired signal comes from a given incident angle using the computed variation due to noise; and
   converting the likelihood that the desired signal comes from a given incident angle into a probability that the desired signal comes from a given incident angle; and
   multiplying the probability that the desired signal comes from a given incident angle by the beamformer output to output a signal with an enhanced signal to noise ratio.

8. The computer-implemented process of claim 7 further comprising temporally smoothing the likelihood estimation that a desired signal comes from a given incident angle prior to converting the likelihood to a probability.

9. The computer-implemented process of claim 8 wherein temporally smoothing the likelihood estimation that a desired signal comes from a given incident angle comprises:
   modeling the absence or presence of the desired signal and frequency bin state over consecutive frequency bins and frames; and
   for a given frequency bin and frame, weighting the likelihood estimation based on the absence or presence of the desired signal and the frequency bin state in previous frames and frequency bins.

10. The computer-implemented process of claim 9 wherein the frequency bin state is modeled using a first order Markov process.

11. The computer-implemented process of claim 7 further comprising convert the enhanced output signal from the frequency domain into the time domain.

12. The computer-implemented process of claim 7 further comprising at least one of:
   encoding the enhanced output signal; and
   transmitting the encoded enhanced output signal; and
   transmitting the enhanced output signal.

13. A computer-readable memory device having computer-executable instructions stored thereon for performing the process recited in claim 7.

14. A system for improving the signal to noise ratio of a signal received from a microphone array, comprising:
   a general purpose computing device;
   a computer program comprising program modules executable by the general purpose computing device, wherein the computing device is directed by the program modules of the computer program to,
   capture audio signals in the time domain with a microphone array;
   convert the time-domain signals to frequency-domain and frequency bins using a converter;
   input the signals in the frequency domain into a beamformer and computing a beamformer output wherein the beamformer output represents the optimal solution for capturing an audio signal at a target point using the total microphone array input;
   estimate the probability that a desired signal comes from a given incident angle using an instantaneous direction of arrival computation, wherein the instantaneous direction of arrival computation comprises:
   for each frequency bin and incident angle from a microphone, estimating an instantaneous direction of arrival point which provides an estimation from which direction a signal or noise source originates;
   computing the distance from each instantaneous direction of arrival point to a theoretical line of instantaneous direction of arrival as a function of the incident angle from a microphone for each frequency bin;

computing the variation due to noise in the estimation from which direction a signal or noise source originates for each frequency bin for a set of incident angles;

performing a likelihood estimation that a desired signal comes from a given incident angle direction using the computed variation due to noise; and converting the likelihood that the desired signal comes from a given incident angle direction into a probability that the desired signal comes from a given incident angle direction; and output an enhanced signal with a greater signal to noise ratio by taking the product of the beamformer output and the probability estimation that the desired signal comes from a given incident angle.

15. The system of claim 14 wherein the instantaneous direction of arrival computation for each frequency bin is based on the phase differences of the input signals from a pair of microphones.

16. The system of claim 14 wherein the likelihood estimation that a desired signal comes from a given incident angle using the computed variation due to noise is temporally smoothed prior to converting the likelihood into the probability.

17. The system of claim 14 wherein the beamformer is a time-invariant beamformer.

18. The system of claim 14 wherein the enhanced signal with a greater signal to noise ratio is computed and output in real time.

19. The system of claim 14 wherein the modules to estimate the probability that a desired signal comes from a given incident angle using an instantaneous direction of arrival computation and the module to output an enhanced signal with a greater signal to noise ratio by taking the product of the beamformer output and the probability estimation that the desired signal comes from a given incident angle form a post-processor that attenuates signals originating from directions other than the direction of the desired signal to output a signal with an enhanced signal to noise ratio.

* * * * *